United States Patent [19]
Florent

[11] Patent Number: 6,151,417
[45] Date of Patent: Nov. 21, 2000

[54] SYSTEM FOR THE PROCESSING OF A SEQUENCE OF NOISY IMAGES AND MEDICAL EXAMINATION APPARATUS INCLUDING SUCH A SYSTEM

[75] Inventor: Raoul Florent, Valenton, France

[73] Assignee: U.S. Philips Corporation, New York, N.Y.

[21] Appl. No.: 09/054,821

[22] Filed: Apr. 3, 1998

[30] Foreign Application Priority Data

Apr. 8, 1997 [FR] France .................................. 97 04282

[51] Int. Cl.[7] .............................................. G06K 9/40
[52] U.S. Cl. .......................................... 382/265; 382/260
[58] Field of Search .................................. 382/260–265, 382/274

[56] References Cited

U.S. PATENT DOCUMENTS

| | | | |
|---|---|---|---|
| 4,240,106 | 12/1980 | Michael et al. | 358/36 |
| 4,468,697 | 8/1984 | Verhoeven | 358/111 |
| 4,504,908 | 3/1985 | Riederer et al. | 364/414 |
| 4,542,459 | 9/1985 | Riederer | 364/414 |
| 4,654,710 | 3/1987 | Richard | 358/169 |
| 4,727,506 | 2/1988 | Fling | 364/745 |
| 4,796,088 | 1/1989 | Nishimura et al. | 358/167 |
| 5,018,179 | 5/1991 | Kaneko | 378/99 |
| 5,467,380 | 11/1995 | De Jonge et al. | 378/98.2 |

*Primary Examiner*—Thomas D. Lee
*Assistant Examiner*—Stephen Brinich
*Attorney, Agent, or Firm*—Dwight H. Renfrew

[57] ABSTRACT

The invention relates to a system for the processing of a noisy image in a sequence of noisy images which includes means for extracting a noisy temporal sample at a given location in the noisy image and for supplying a corresponding temporally filtered sample in order to form a noise-filtered image. The system includes recursive temporal filtering means which include means for forming a sum of a corresponding sample ($Y_{t-1}$) of an already filtered preceding image of the sequence and a corresponding sample [$\Delta_t(x,y)$] of a difference image ($S_t-Y_{t-1}$) formed between the noisy image and the filtered preceding image and weighted by a recursion factor ($K_t$); they also include two-dimensional spatial filtering means ($F_{2D}$) which are applied to said difference image in order to enhance spatially coherent samples and to supply a measure of probability of motion ($\beta_t$) which is linked to said spatially coherent samples, and means for applying a scalar function ($f_1$) in order to generate said recursion factor ($K_t$) in dependence on said measure of probability of motion ($\beta_t$). The invention also relates to an X-ray examination apparatus including such a system.

9 Claims, 4 Drawing Sheets

US 6,151,417

SYSTEM FOR THE PROCESSING OF A SEQUENCE OF NOISY IMAGES AND MEDICAL EXAMINATION APPARATUS INCLUDING SUCH A SYSTEM

FIELD OF THE INVENTION

The invention relates to a system for the processing of a noisy image in a sequence of images which includes means for the temporal filtering of the noise. The invention also relates to a medical examination apparatus which includes such a system.

The invention can be used for the manufacture of medical X-ray examination apparatus.

BACKGROUND OF THE INVENTION

A medical X-ray examination apparatus with an imaging device is already known from the patent U.S. Pat. No. 5,467,380 (de Jonge et al). The imaging device produces a sequence of images and includes a system for processing the images of the sequence so as to reduce the noise. This system includes first recursive temporal filtering means which form a sum of an already temporally filtered image and a difference image which is weighted by a recursion factor. This recursion factor is provided by a table and is inversely proportional to the difference whereto it is applied. The difference image is formed by calculation, at points of given location, of the intensity differences between the noisy image to be treated and a preceding image which has already been temporally filtered. This system also includes motion detection means which are formed by a comparator which compares the intensity differences in the difference image with a noise threshold and signals the presence of a moving object when a difference in the difference image exceeds this threshold. This system also includes spatial filtering means for providing, on the basis of the noisy image, an image smoothed by low-pass filtering. Finally, this system includes means for forming the sum of said image smoothed by low-pass filtering and the recursively temporally filtered image, said images being assigned respective weights which favor either the spatially filtered image, in the case where a moving object has been detected, or the temporally filtered image in the opposite case.

A problem is encountered in that in the known system intensity differences due to the noise peaks cannot be distinguished from those which are due to the movements. Another problem consists in that this known system outputs a low-pass smoothed image instead of a temporally filtered image in case a moving object has been detected; such low-pass spatial filtering, applied directly to a noisy image, blurs the contours so that small objects in motion may be lost.

Citation of a reference herein, or throughout this specification, is not to be construed as an admission that such reference is prior art to the Applicant's invention of the invention subsequently claimed.

SUMMARY OF THE INVENTION

It is an object of the present invention to propose an improved image processing system of this kind for filtering the noise in a sequence of images representing very small objects, such as catheters or optical fibers, without excluding image parts representing such very small objects in motion.

This object is achieved by means of a system for the processing of a noisy image in a sequence of images which includes means for extracting a noisy temporal sample at a given location in the noisy image and for supplying a corresponding, recursively temporally filtered sample for the formation of a noise-filtered image, said system including:

recursive temporal filtering means which include means for forming a sum of a corresponding sample of an already filtered preceding image of the sequence and a corresponding sample of a difference image formed between the noisy image and the filtered preceding image and weighted by a recursion factor, two-dimensional spatial filtering means which are applied to said difference image in order to enhance spatially coherent samples and to supply a measure of probability of motion which is linked to said spatially coherent samples, and means for applying a scalar function to said measure of probability of motion in order to generate said recursion factor in dependence on the measure of probability of motion.

The system according to the invention offers inter alia the following advantages: it is simple, can operate in real time, applies the temporal filtering effectively to the image parts with and without an object in motion so that the edges of the object are not blurred and the very small objects in motion are not lost, and strongly reduces the noise peaks.

The invention also relates to a medical X-ray examination apparatus for forming a sequence of X-ray images which includes an X-ray detector for converting the successive images of the sequence into digital signals and also includes a system of the kind set forth for the processing of a noisy image in a sequence of images so as to supply a noise-filtered image.

This apparatus offers the advantage that it supplies better images, particularly in the case where the illumination intensity of the object whose image is formed is low; it nevertheless enables an operator to track very small objects in motion accurately during display of the sequence of images.

BRIEF DESCRIPTION OF THE DRAWINGS

The invention will be described in detail hereinafter with reference to the attached diagrammatic drawings; therein.

DESCRIPTION OF THE PREFERRED EMBODIMENTS

I/ X-ray apparatus

Figure 1A:
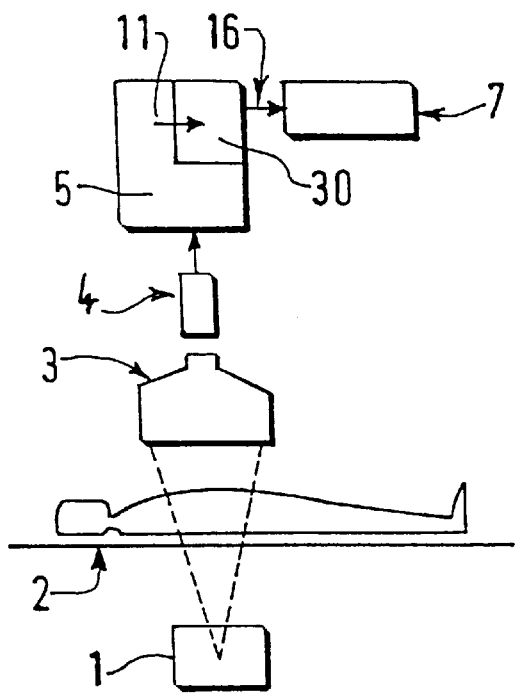
FIG. 1A shows an X-ray apparatus and FIG. 1B shows a system for processing the noise of an image.

FIG. 1A shows, by way of example, an X-ray examination apparatus which includes an X-ray source 1, a table 2 for accommodating a patient, an image intensifier device 3 which is coupled to a camera tube 4 which applies data to a digital image processing system 5 which includes a processor provided with means 30 which are suitable to form an image processing system. The processor has several outputs, one output 16 of which is coupled to a monitor 7 for the visualization of the sequence of radiographic images or intensity images.

The present invention takes into account neither the method used to acquire the sequence of digital images nor the nature of the objects represented therein, but deals exclusively with the filtering of the images in this sequence so as to eliminate the noise and the noise peaks, without excluding objects in motion.

II/ System for the temporal filtering of the noise

Figure 1B:
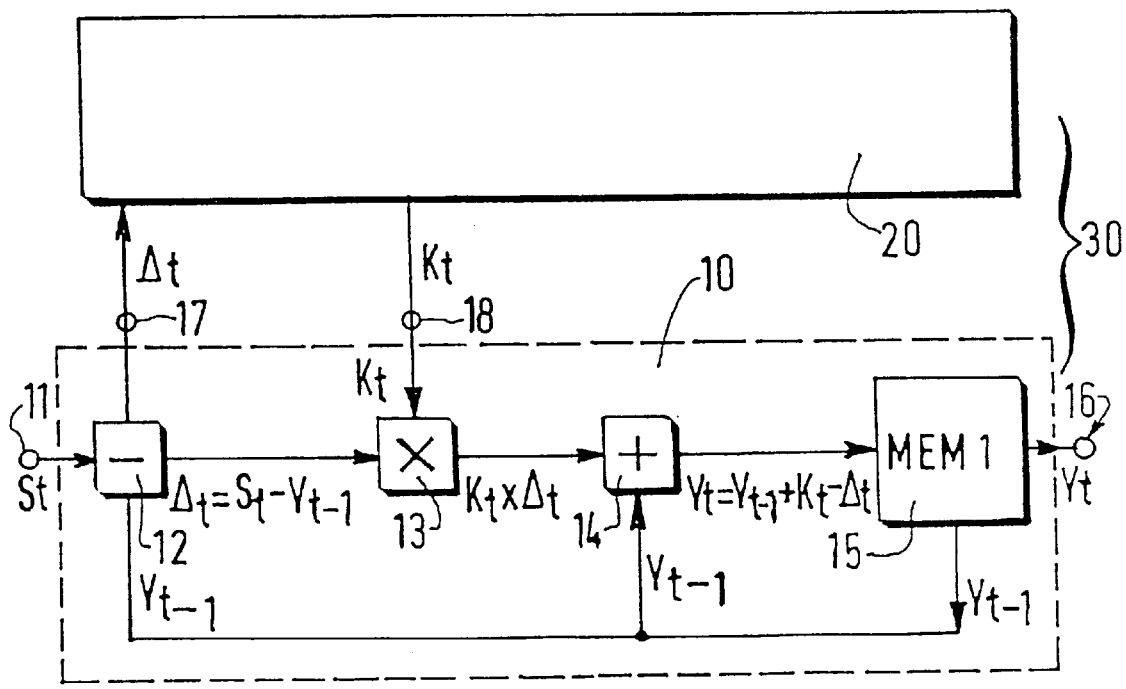
Figure 2A:
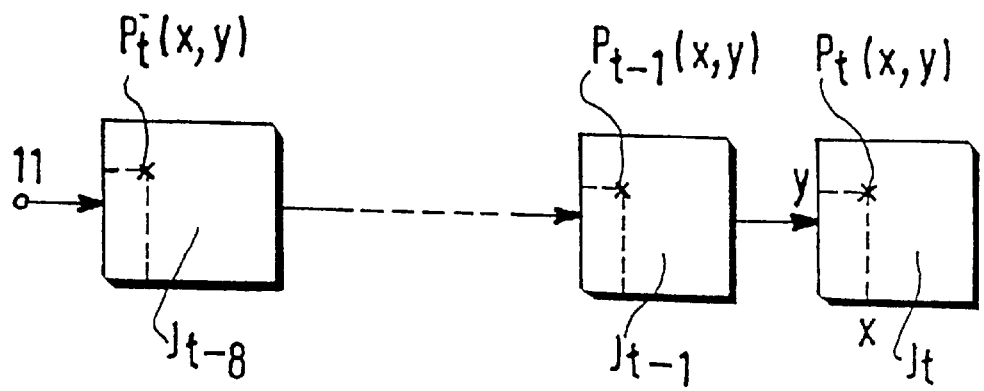
FIGS. 2A and 2B show a sequence of noisy images and a difference image, respectively.

FIG. 1B shows an image processing system 30 which includes noise reduction means 10, 20 which are applied to an image of a sequence of noisy images, i.e. in image zones without an object in motion as well as in image zones containing an object in motion. FIG. 2A shows, by way of example, a sequence of noisy images which are successively referenced as $J_{t-8}, \ldots, J_{t-1}, J_t$. The system 30 is capable of operating in real time while processing the last image $J_t$ observed in the sequence.

Figure 4A:
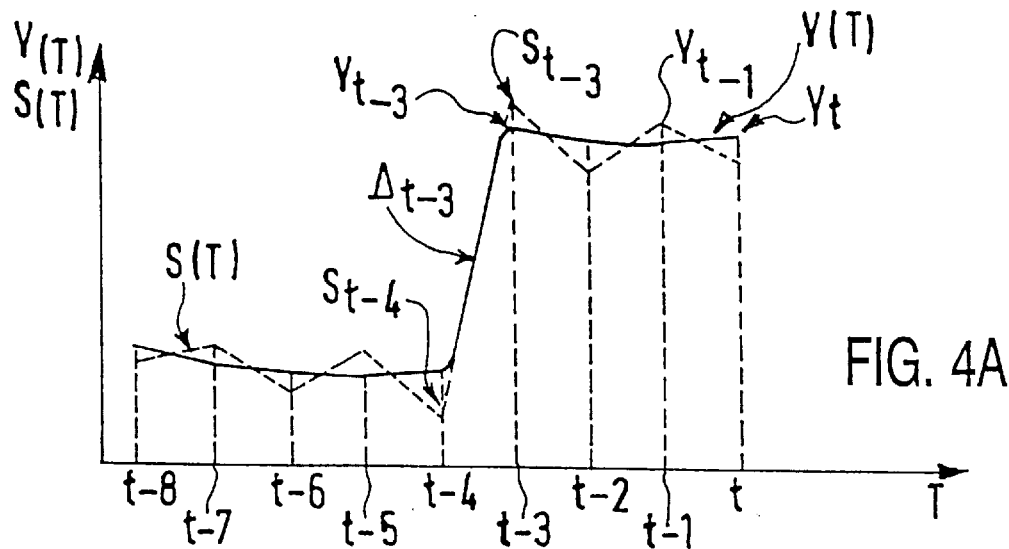
FIGS. 4A and 4B both show a noisy temporal signal S(T) as a dotted line and a filtered temporal signal Y(T) as a solid line.
Figure 4B:
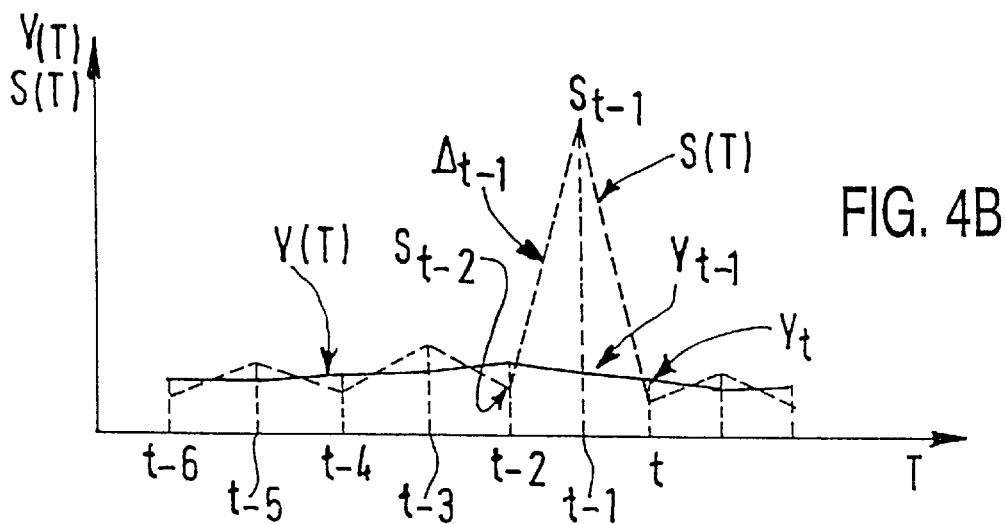

FIGS. 4A and 4B show noisy temporal signals S(T) and noise-filtered temporal signals Y(T). The noisy temporal signal S(T) is formed by extracting from the sequence of images, at a point P of given location x,y, successive noisy samples $S_{t-8}, \ldots, S_{t-1}, S_t$ which represent the intensity of the point P(x,y) in the successive images as a function of a numbering or temporal marking t-8, ..., t-1, t of the images of the sequence. The filtered temporal signal Y(T) is formed by successive samples $Y_{t-8}, \ldots, Y_{t-1}, Y_y$ filtered by the system 30 and corresponding to the noisy samples acquired from the given location x,y in the original images of the sequence.

Figure 2B:
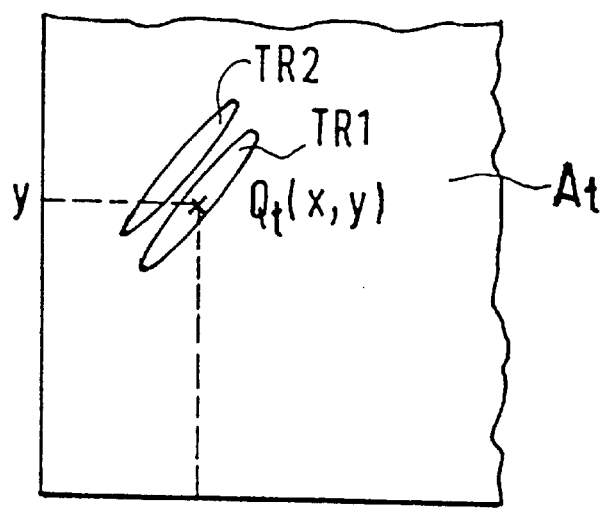

Referring to FIG. 1B, the image processing system 30 includes temporal filtering means 10 whose input 11 receives a sample $S_t(x,y)$ of the noisy temporal signal and whose output 16 supplies a corresponding sample $Y_t(x,y)$ of the temporally and recursively filtered signal. Said temporal filtering means 10 include summing means 14 for forming a sum of a sample $Y_{t-1}(x,y)$ of a preceding image of the sequence, already temporally filtered by the temporal filtering means 10, and a sample $\Delta_t(x,y)$ of a difference image $A_t$, weighted by a recursion factor $K_t$. The difference image $A_t$ is formed, as shown in FIG. 2B, between the noisy image $J_t$ and a preceding image of the sequence which has already been filtered. Referring to the FIGS. 1B and 2B, said sample $A_t(x,y)$ is calculated at a point $Q_1(x,y)$ of the difference image $A_t$ by the summing means 12 which subtract the value of the noisy sample $S_t(x,y)$ from the value of the already filtered sample $Y_{t-1}(x,y)$. The already recursively temporally filtered sample $Y_{t-1}(x,y)$ originates from storage means or delay means MEM1 which are denoted by the reference 15. The recursive temporal filtering means 10 thus perform calculations in order to supply a filtered sample $Y_t(x,y)$:

$$Y_t(x,y)=Y_{t-1}(x,y)+K_t\Delta_t(x,y) \qquad 1)$$

where $$\Delta_t(x,y)=S_t(x,y)-Y_{t-1}(x,y) \qquad 2)$$

The image processing system 30 also includes means 20 for generating the recursion factor $K_t$ appropriate for the weighting of the sample $\Delta_t(x,y)$ of the difference image in the recursive temporal filtering relation denoted by the reference 1).

Figure 3A:
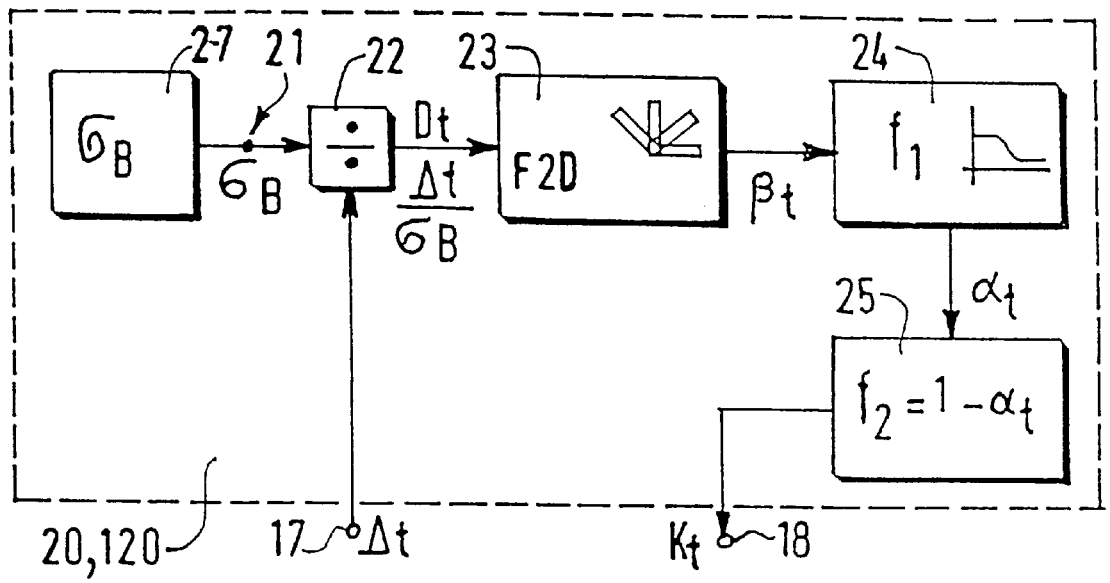
FIGS. 3A and 3B show first and second means for generating a recursion factor for such a system.
Figure 3B:
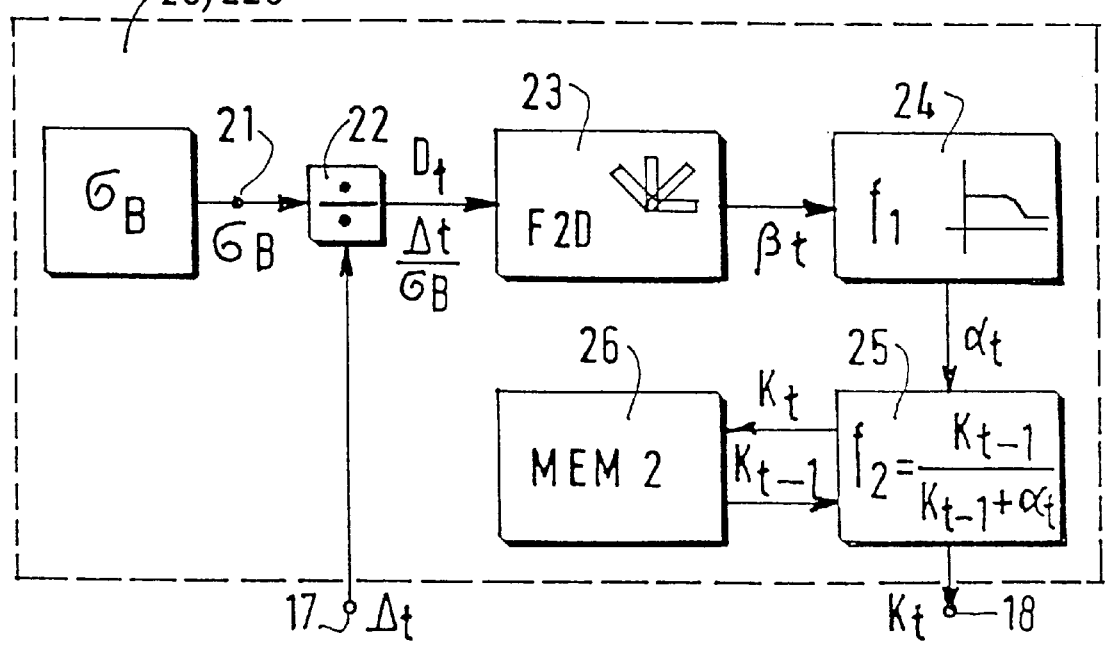

Referring to the FIGS. 3A and 3B, the means 20 for generating the recursion factor $K_t$ include an input 17 for the sample $\Delta_t(x,y)$ of the difference image, an input 21 for a normalization value $\sigma_B$, which is referred to as the standard noise deviation, and calculation means 22 for performing the normalization of the sample $\Delta_t(x,y)$ with the standard noise deviation $\sigma_B$, thus supplying a normalized difference sample as:

$$D_t(x,y)=\Delta_t(x,y)/\sigma_B 3)$$

Said normalized difference sample $D_t(x,y)$ is then processed by a two-dimensional spatial filter 23 which is referenced $F_{2D}$ and performs a two-dimensional non-linear smoothing operation which is oriented around the point $Q_1(x,y)$ of given location x,y in the difference image $A_t$ considered. This spatial filter 23 provides a measure of probability of motion which is referenced $\beta_t(x,y)$ and formulated as:

$$\beta_t(x,y)=F_{2D}[D_t(x,y)] \qquad 4)$$

The means 20 for generating $K_t$ include calculation means 24 for applying a decreasing scalar function $f_1$ to the measure of probability of motion $\beta_t(x,y)$ and for supplying a coefficient which is written as $\alpha_t$ and formulated as:

$$\alpha_t=f_1[\beta_t(x,y)] \qquad 5)$$

Said means 20 for generating $K_t$ also include calculation means 25 for applying a function $f_2$ to said coefficient $\alpha_t$, thus yielding the desired recursion factor $K_t$ in conformity with the formule $$K_t=f_2(\sigma_t) \qquad 6)$$

The function $f_2$ for generating the recursion factor $K_t$ may be a recursive or a non-recursive relation. The image processing system, already including the recursive temporal filter 10, is then either double recursive or single recursive.

Figure 4C:
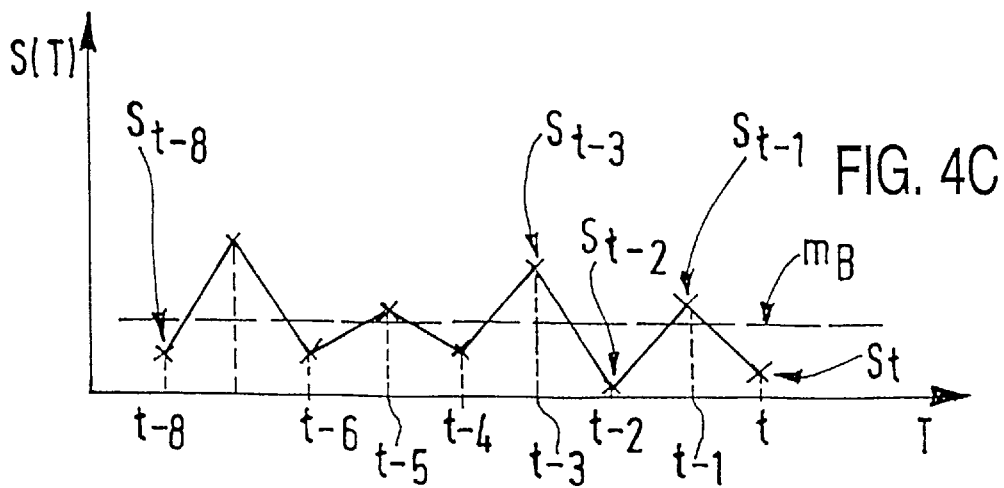
FIG. 4C shows a noisy temporal signal.

Referring to the FIGS. 3A and 3B, two embodiments of the means for generating the recursion factor $K_t$ will be described hereinafter by way of non-limitative examples and denoted by the references 120 and 220. The calculation means 22 are formed by a divider which receives the standard noise deviation $\sigma_B$ and the sample $\Delta_t(x,y)$ of the difference image $A_t$ from the summing device 12 of the block 10. The calculation means 22 supply the normalized difference sample $D_t(x,y)$. It will be recalled that the standard noise deviation $\sigma_B$ is the square root of the noise variance $\sigma_B^2$ at the point $Q_t(x,y)$ of the difference image $A_t$. Referring to FIG. 4C, showing a noisy temporal signal S(T), the standard noise deviation can be obtained by calculating first the noise variance $\sigma_B^2$ as the mean value of the squared noise deviations of a given number of samples of the noisy signal S(T), said deviations being measured with respect to the mean intensity $m_B$ of said temporal samples. The calculation of $\sigma_B$ as the square root of the variance of the noise thus evaluated constitutes a suitable approximation. The values of the noise standard deviation $\sigma_B$ may be provided by a so-called LUT (Look-Up Table) table 27. (The values of other functions, such as $f_1$ or $f_2$, may also be provided by suitable look-up tables.)

Figure 5A:
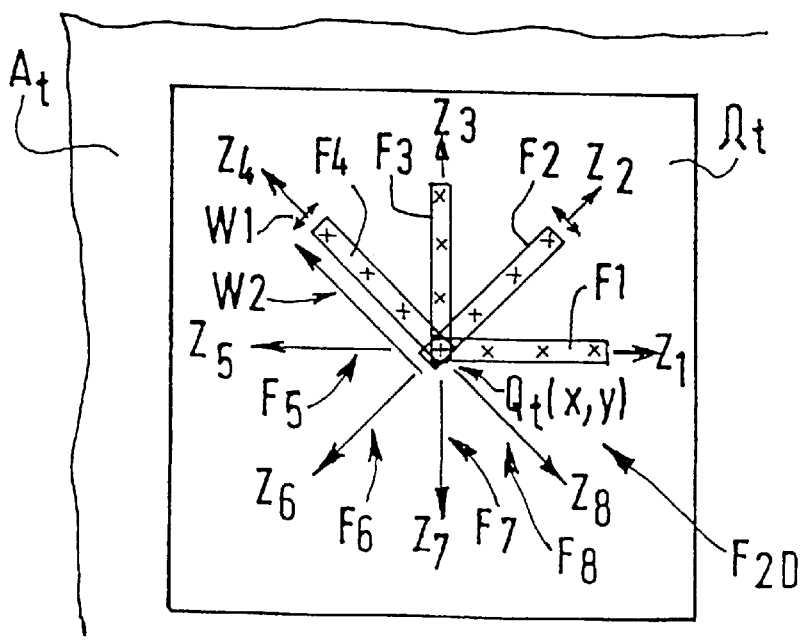
FIG. 5A shows a two-dimensional spatial filter $F_{2D}$.

The normalized difference sample $D_t(x,y)$ is applied to the two-dimensional spatial filter 23, referenced $F_{2D}$, in order to supply the measure of probability of motion $\beta_t(x,y)$. Referring to FIG. 5A, said spatial filter 23 performs an oriented two-dimensional non-linear smoothing operation; to this end it includes a plurality N of linear operators which are formed by linear sub-filters $F_1, \ldots, F_N$ which are arranged radially around a common point which is situated at one of their extremities and coincides with the point $Q_t(x,y)$ of the difference image $A_t$ to be filtered. The sub-filters are regularly distributed in space along axes QZ1 to QZN which are spaced angles $2\pi/N$ apart. The dimension of the supports of the sub-filters is W2 along the axes QZ1, . . . , QZN and W1 in the direction perpendicular to said axes, where W2>W1. For example, W1 equals 1 or 2 pixels and W2 equals from 5 to 10 pixels. The sub-filters form mean values with coefficients which are constant or decrease from the extreme point $Q_t(x,y)$. For example, N=8 directions suffice. At the point $Q_t(x,y)$ the sub-filters calculate a number N (for example, 8) of mean values which are referenced $M_1(Q)$, $M_2(Q)$, . . . , $M_8(Q)$.

In a difference image such as $A_t$ shown in FIG. 2B, a motion such as that corresponding to the ascending edge $\Delta_{t-3}$ of the temporal signal shown in FIG. 4A generates bands which are referenced TR1 and TR2 and are formed in general by two bands which are positive and negative, respectively, or vice versa, depending on the contrast of the object in motion and the direction. The two-dimensional spatial filter $F_{2D}$ enhances the intensity of the spatially coherent samples in the difference image $A_t$. Therefore, the bands TR1, TR2 of the difference image, being small coherent and oriented structures, are enhanced by the passage of the support of the sub-filter of the same orientation.

The spatial filter $F_{2D}$ also includes a selection operator for selecting a minimum value referenced $MIN(F_{2D})$ and a maximum value referenced $MAX(F_{2D})$ from among the N=8 mean values M1(Q) to M8(Q); it also includes a selection operator for selecting, between MIN $(F_{2D})$ and $MAX(F_{2D})$, the value nearest to the normalized intensity $D_t(x,y)$ of the point $Q_t(x,y)$ of the difference image $A_t$, referenced $OPT(F_{2D})$ so that:

$$OPT(F_{2D})=MAX\ (F_{2D})\ \text{if}\ |MAX(F_{2D})-D_t(x,y)|>|MIN(F_{2D})-D_t(x,y)|\quad (7a)$$

or $$OPT(F_{2D})=MIN(F_{2D}) \quad 7b),$$

in the opposite case.

The calculated optimum value $OPT(F_{2D})$ is referenced $\beta_t$ for simplification and is a measure of the probability of motion given by the spatial filtering $F_{2D}$ of the image $A_t$ of the intensity differences between the noisy image $J_t$ and the image already filtered at a previous instant, while considering corresponding pixels having the same location x,y. The evaluation of $\beta_t$ enables the intensity values due to the noise to be separated from those corresponding to a motion. Actually, only the values corresponding to a motion are coherent. Thus, the coherent structures formed by the bands due to a movement in the difference image are used to separate a component which is due to the noise, and hence is spatially non-coherent, from components which are due to one or more motions and hence are spatially coherent. Thus, the detection of motion is insensitive to the noise. This motion detection enters the calculation of the recursion factor $K_t$ and enhances the calculation of the temporal discontinuity $\Delta_t(x,y)$.

Figure 5B:
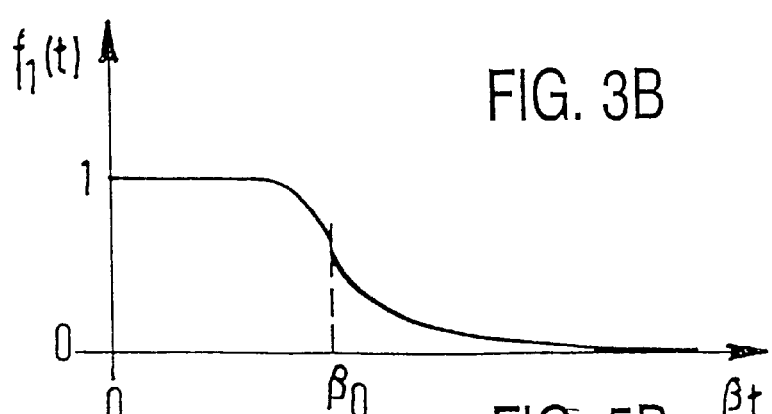
FIG. 5B shows a scalar function $f_1$.

The measure $\beta_1$ of the probability of motion is then subjected to the scalar function $f_1$, for example as represented in FIG. 5B. This function is a strictly decreasing function and has an inflection point for a value $\beta_t=\beta_0$. This function $f_1$ enables improved elimination of the noise while preserving the measures corresponding to the motion when $\beta_t>\beta_0$ and eliminating the measures corresponding to the noise when $\beta_t<\beta_0$. The result of the application of the scalar function $f_1$ to $\beta_t$ is referenced $\alpha_t$, being a coefficient enabling calculation of the recursion factor $K_t$.

In a version 120 the recursion factor $K_t$ is calculated in a simple manner, in the block 25, by way of a first function which is written as $$f_2=1-\alpha_t \quad (6a)$$

The result $K_t$ is available at the node 18.

In a recursive version 220, the recursion factor $K_t$ is calculated in the block 25, while utilizing integration of the past, by another function which is written as:

$$f_2=K_{t-1}/(K_{t-1}+\alpha_t) \quad 6b)$$

where $K_{t-1}$ is a recursion coefficient calculated in the past so as to correspond to the already filtered sample $Y_{t-1}$. To this end, $K_{t-1}$ is stored in storage or delay means MEM2 which are referenced 26.

This filtering operation enables elimination of the holes as well as the noise peaks such as $S_{t-1}$ as shown in FIG. 4B. This filtering operation enables preservation of the small details undergoing a motion as shown at $\Delta_{t-3}$ in FIG. 4A. This filtering operation preserves the intensity of small objects in motion and nevertheless reduces the noise, thus increasing the signal-to-noise ratio by approximately a factor of 2.

This result can be improved by better separation of the components of the signal which are due to the noise from those which are due to a motion.

The application of the operator $OPT(F_{2D})$ yielded a filtered signal having a noise lobe which is referenced LB and formed by points having an intensity level due to the noise detected by the various sub-filters $F_1$ to $F_N$, said lobe LB being centered around the intensity zero, and occasionally one or more motion lobes which are referenced LM1, LM2 . . . , depending on whether the difference image contains one or two parallel bands TR1, TR2 due to a motion; the motion lobes LM1, LM2 . . . were formed by points having an intensity different from that of the noise lobe LB and were situated to both sides of said noise lobe LB with respect to zero intensity.

The foregoing operator $OPT(F_{2D})$ is replaced by an operator $OPT'(F_{2D})$ which first calculates $OPT(F_{2D})$ as indicated before. The new operator $OPT'(F_{2D})$ then calculates a new value $\beta_t$ while performing a selection, from among the mean values M1(Q), M2(Q), . . . MN(Q), of one or more mean values which are referenced $M_n$ and are nearest to the value $OPT(F_{2D})$ previously determined while taking into account a threshold $\Theta$ in conformity with the following relation:

$$|M_n(F_{2D})-OPT(F_{2D})|<\Theta \quad 8)$$

where $M_n(F_{2D})$ is one of the mean values M1(Q) to MN(Q) and where $\Theta$ is a threshold which is taken to be equal to 1 in the present application since the spatial filter $F_{2D}$ is applied to the sample $D_t(x,y)$ normalized by the standard noise deviation $\sigma_B$. The operator $OPT'(F_{2D})$ then calculates a mean value, referenced $MOY[M_n(F_{2D})]$ of the values $M_n(F_{2D})$ selected by the relation 8), being the desired measure of probability of motion $\beta_t$.

In these circumstances the signal-to-noise ratio after filtering according to the invention is increased by a factor which is at least equal to 6 (six).

All references cited herein, as well as the priority document French Patent Application 9704282 filed Apr. 8, 1997, are incorporated herein by reference in their entirety and for all purposes to the same extent as if each individual publication or patent or patent application was specifically and individually indicated to be incorporated by reference in its entirety for all purposes.

What is claimed is:

1. A system for the processing of a noisy image in a sequence of noisy images in order to supply a recursively-temporally filtered sample for the formation of a noise-filtered image, the system comprising:

means for extracting a noisy temporal sample at a given location in the sequence of noisy images, recursive temporal filtering means which include means for forming a sum of a corresponding sample ($Y_{t-1}$) of an already filtered preceding image of the sequence and a corresponding sample [$\Delta_t(x,y)$] of a difference image ($S_t-Y_{t-1}$) formed between the noisy image and the filtered preceding image which is weighted by a recursion factor ($K_t$), two-dimensional spatial filtering means ($F_{2D}$) which are applied to said difference image in order to enhance spatially coherent samples and to supply a measure of probability of motion ($\beta_t$) which is linked to said spatially coherent samples, means for applying a scalar function ($f_1$) to said measure of probability of motion ($\beta_t$) to supply an output coefficient ($\alpha_t$), and means for generating said recursion factor ($K_t$) in dependence on said output coefficient ($\alpha_t$).

2. A system as claimed in claim 1 wherein the means for generating said recursion factor ($K_t$) further comprises calculation means for applying a non-recursive function ($f_2$) to said output coefficient ($\alpha_t$) of said scalar function ($f_1$).

3. A system as claimed in claim 1 wherein the means for generating said recursion factor ($K_t$) further comprises calculation means for applying a recursive function ($f_2$) to said output coefficient ($\alpha_t$) of said scalar function ($f_1$).

4. A system as claimed in claim 1 wherein the two-dimensional spatial filtering means ($F_{2D}$) further comprises:

averaging means which are regularly spatially oriented around a sample of said difference image and are for yielding a minimum filtered and a maximum filtered intensity value, and selection means for supplying an optimum intensity value which is chosen from among the minimum and maximum values as the value nearest to the non-filtered intensity of said sample in order to provide said measure of probability of motion ($\beta_t$).

5. A system as claimed in claim 1 wherein the two-dimensional spatial filtering means ($F_{2D}$) further comprises:

averaging means which are regularly spatially oriented around a sample of said difference image and are for supplying a respective mean value for each orientation, selection means for supplying a minimum filtered, a maximum filtered intensity value, and an optimum intensity value which is chosen from among the minimum and maximum values as the value nearest to the non-filtered intensity of said sample, and calculation means for supplying a mean value of the mean values for each orientation chosen from among said mean values as the values nearest to said optimum value as a function of a predetermined threshold in order to supply said measure of probability of motion ($\beta_t$).

6. A system as claimed in claim 1 wherein the scalar function ($f_1$) is a decreasing function of the measure of probability of motion ($\beta_t$), and wherein the means for applying the scalar function ($f_1$) further comprises a look-up table defining said decreasing function.

7. A system as claimed in claim 2 wherein the calculation means for applying the non-recursive function ($f_2$) further comprises a look-up table defining a relation ($1-\alpha_t$) applied to said output coefficient ($\alpha_t$) of said scalar function ($f_1$), wherein said relation comprises one minus said output coefficient.

8. A system as claimed in claim 3 wherein the calculation means for applying the recursive function ($f_2$) further comprises a look-up table defining a relation ($K_{t-1}/K_{t-1}+\alpha_t$) applied to said output coefficient ($\alpha_t$) of said scalar function ($f_1$) and to said recursion factor ($K_{t-1}$) relating to a preceding temporally filtered image, wherein said relation comprises said recursion factor divided by the sum of said recursion factor and said output coefficient.

9. An X-ray examination apparatus comprising:

an X-ray detector for forming a sequence of successive images, means for converting said successive images into a sequence of digital images, an image processing system as claimed in claim 1 in order to reduce the noise in the images of the sequence, and a device for displaying the images of the sequence.

* * * * *